G. W. MILLER.
PHOTOGRAPHIC VIEW FINDER.
APPLICATION FILED JUNE 29, 1915.
1,219,129.
Patented Mar. 13, 1917.
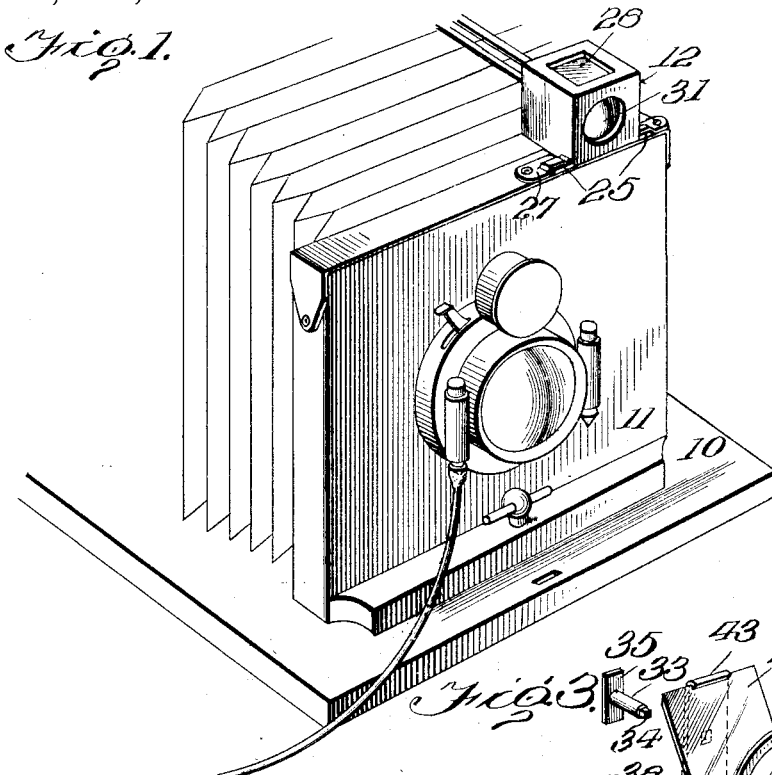
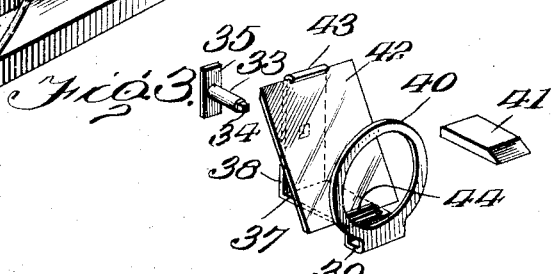
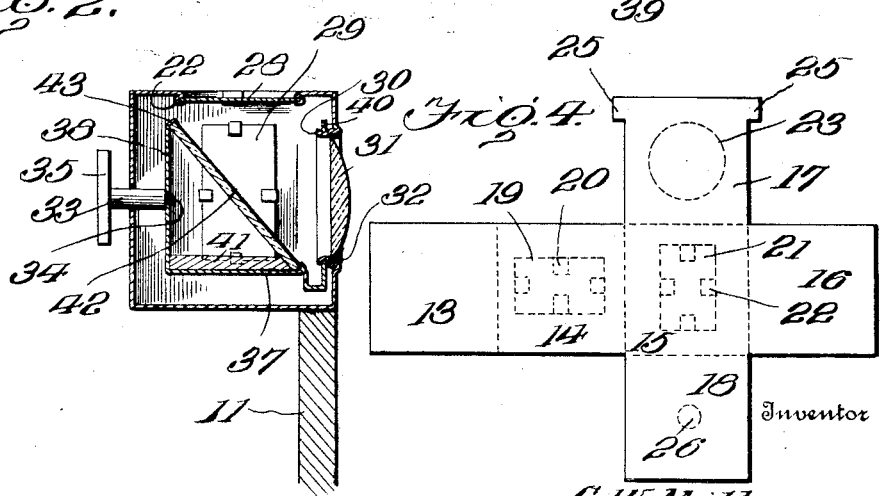
Inventor
G. W. Miller;
By
Attorneys

UNITED STATES PATENT OFFICE.

GEORGE W. MILLER, OF MIDLAND, TEXAS.

PHOTOGRAPHIC VIEW-FINDER.

1,219,129.  Specification of Letters Patent.  Patented Mar. 13, 1917.

Application filed June 29, 1915. Serial No. 37,082.

*To all whom it may concern:*

Be it known that I, GEORGE W. MILLER, a citizen of the United States, residing at Midland, in the county of Midland and State of Texas, have invented certain new and useful Improvements in Photographic View-Finders, of which the following is a specification.

This invention contemplates an improved photographic view finder and has as its primary object to provide a finder having independent image screens respectively adapted for vertical and horizontal exposures so that in each instance, only such objects will be shown upon the screen, as will actually appear in the picture.

The invention has as a further object to provide a finder wherein the mirror thereof will be automatically shiftable to coöperate with each of the said screens as the camera is moved to take a horizontal or vertical exposure.

A still further object of the invention is to provide an improved mounting for the mirror for pivotally supporting the mirror in position and to also provide in connection therewith, a weight for automatically shifting the mirror when the camera is shifted.

And a still further object of the invention is to provide a simply constructed casing for the mirror which may, in the practical manufacture of the invention, be formed from a single sheet of material.

Other and incidental objects will appear as the description proceeds and in the drawings wherein I have illustrated the preferred embodiment of the invention and wherein similar reference characters designate corresponding parts throughout the several views, Figure 1 is a perspective view showing my improved finder applied to a conventional type of camera, Fig. 2 is a sectional view taken through the finder and more particularly showing the mounting of the mirror employed, Fig. 3 is a perspective view showing the mirror frame detached and the weight carried by the frame, as well as showing the post which pivotally supports the frame at one end, Fig. 4 is a plan view of the blank from which the casing of the finder is formed.

For convenience, I have illustrated my improved finder in connection with a camera 10 having a lens board 11, the finder being mounted upon the said board at one corner thereof. More particularly, the finder includes a casing 12 which is preferably formed from a blank of suitable sheet metal, this blank being shown in detail in Fig. 4 of the drawings.

The blank is formed to provide a bottom wall 13, a side wall 14, a top wall 15, and an opposite side wall 16, which are defined by lines of fold indicated by dotted lines in this figure. Extending from opposite ends of the top wall 15 is a front wall 17 and a back wall 18. The side wall 14 is formed to provide an opening 19 indicated by dotted lines, into which project a plurality of tongues 20. A similar opening 21 also indicated in dotted lines is formed in the top wall 15 and projecting into said opening are a plurality of tongues 22, the tongues 20 and 22 being integral with the body of the blank.

Formed in the front wall 17 is a circular opening indicated in dotted lines at 23, while the said front wall, at its outer end, is provided with terminal oppositely disposed lugs 25 extending laterally upon each side of the said front wall. The rear wall of the blank is provided with a circular opening 26 also indicated in dotted lines.

The blank thus formed is bent upon the several lines of fold thereof to provide the substantially rectangular casing 12, with the lugs 25 extending laterally from opposite sides thereof. The casing is mounted upon the lens-board 11 with the bottom wall 13 seating flatly against the upper edge of said board and detachably connecting the casing with the lens board are oppositely disposed clips 27 which frictionally receive the lugs 25.

Seating against the inner face of the top wall 15 and covering the opening 21 thereof, is an image screen 28 of glass or other suitable material which is held in position by the lugs 22, the said lugs being bent to embrace the edges of the screen as more particularly shown in Fig. 2 of the drawings. A similar image screen 29 is arranged to cover the opening 19 and is held in position by the lugs 20 in like manner. In forming the opening 23 in the front wall 17 of the casing, the margin of the casing surrounding the said opening is bent inwardly into the casing to define an annular flange 30 surrounding the said opening. The flange 30 is offset intermediate its length to define an annular shoulder against which seats a suitable lens 31. Securing the lens in position, is a locking ring 32.

Extending through the opening 26 in the back wall 18 of the casing is a stem 33 which, at its inner end, is provided with a squared terminal 34. The stem, at its outer end, is formed with a laterally directed head 35 which provides a handle.

Arranged within the casing is a mirror frame or shelf more particularly shown in Fig. 3 of the drawings. This frame is preferably formed from a single piece of suitable sheet metal bent intermediate its ends to define a base 37 from one extremity of which extends, at substantially right angles, an arm 38. At its extremity opposite the arm 38, the base 37 is bent to define a substantially U-shaped offset neck 39 which, at its outer end, is formed into an upstanding annulus or collar 40 arranged substantially parallel to the arm 38. The arm 38, intermediate its ends, is formed with a squared opening which receives the terminal 34 of the stem 33, while the collar 40 fits freely around the flange 30, as shown in Fig. 2 of the drawings. The mirror frame is thus swingingly supported within the casing, and mounted upon the base 37 of the said frame is a weight 41.

Mounted upon the mirror frame, at a 45° angle is a suitable mirror 42 which, in length, is substantially equal to the length of the screen 28 and in width, is substantially equal to the length of the screen 29. The mirror is arranged to extend between the arm 38 and base 37 of the frame, the arm 38 being bent adjacent its upper extremity to provide a flange 43 embracing the upper edge of the mirror, while a flange 44 is struck from the base adjacent the outer extremity thereof and is arranged to embrace the lower edge of the mirror.

From the preceding description, it will be seen that when the camera 10 is held in normal position as shown in Fig. 1 of the drawings, the weight 41 will gravitate to hold the mirror 42 in position to throw an image upon the screen 28 in which position of the camera, a vertical exposure may be taken. When the camera is then turned upon its side with the screen 29 uppermost, the weight 41 will gravitate to move the mirror 42 to a position to throw an image upon the said screen when a horizontal exposure may be taken. Thus, I provide a separate image field for each exposure and the confusion incident to intersecting image fields as now commonly employed upon conventional types of view finders will consequently be eliminated. In this connection, it is to be observed that by the use of separate image fields for each exposure, only such images can be observed respectively in each of the fields as will actually appear in the picture. Furthermore, particular attention is directed to the fact that the weight 41 will act to automatically shift the mirror 42 as the camera is moved to obtain either a vertical or a horizontal exposure.

Should the weight 41 fail in any instance to pivotally shift the mirror, it will be seen that the head 35 of the stem 33 may be readily grasped to manually actuate the mirror frame for bringing the mirror into proper position. This is obviously a feature of advantage and furthermore, attention is directed to the fact that should the mirror frame tend to oscillate when the camera is shifted to take either a horizontal or vertical exposure, the stem 33 may be grasped to arrest the movement of the mirror frame and consequently immediately bring the mirror into proper desired position.

It will be understood, of course, that while I have shown the view finder as provided with a vertical image field in the normal position thereof, making it necessary to shift the camera to obtain a horizontal image field, still, this arrangement may be reversed if desired, in the practical manufacture of the device, without in the least departing from the spirit of the present invention.

Having thus described my invention, what I claim and desire to secure by Letters Patent is:—

1. A device of the character described including a casing provided with sight openings, there being a lens opening formed in the casing and surrounded by an annular flange, a stem mounted within the casing and having a finger portion projecting outwardly of the casing, a mirror frame pivotally supported by said stem and having an annulus freely embracing the said flange and a mirror carried by said frame, the said frame being adapted for movement to dispose the mirror in coöperative relation relative to the lens opening and each of said sight openings.

2. A device of the character described including a casing provided with sight openings and having a lens opening formed therein, a flange arranged adjacent said lens opening, a stem projecting into the casing, a frame swingingly supported by said flange and stem, and a mirror carried by the frame, the flange being adapted to support a lens and the stem being adapted to provide a handle for shifting the mirror into coöperative relation with said lens and each of said sight openings respectively.

3. In a device of the class described, a casing, a lens mounted within one wall of the casing, the casing being provided with sight openings, a bearing surrounding the lens, a frame provided with an annulus rotatably fitting the said bearing, a mirror supported within the frame and presented in the general direction of the lens and arranged in the turning movement of the frame to be presented toward one or the other of the said sight openings, a stem rotatably fitted through that wall of the casing which is opposite the said lens and secured at its inner end to the said casing, the stem being located axially with respect to the bearing surrounding the lens, and a finger piece upon the stem located outwardly of the said casing.

In testimony whereof I affix my signature.

GEORGE W. MILLER. [L. S.]

Copies of this patent may be obtained for five cents each, by addressing the "Commissioner of Patents, Washington, D. C."